July 8, 1924.
W. M. BRITTON
AXLE
Filed Aug. 30, 1920
1,500,436
3 Sheets-Sheet 1
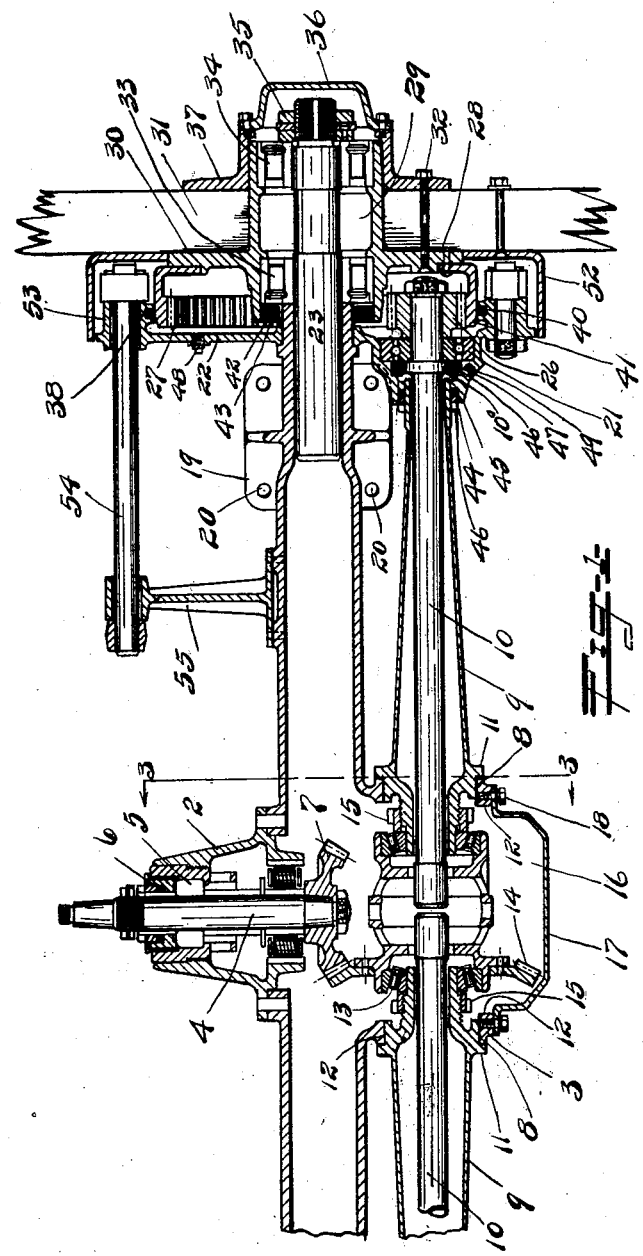
INVENTOR.
William M. Britton.
BY
Monroe & Farman
ATTORNEYS.

July 8, 1924.
W. M. BRITTON
AXLE
Filed Aug. 30, 1920
1,500,436
3 Sheets-Sheet 2
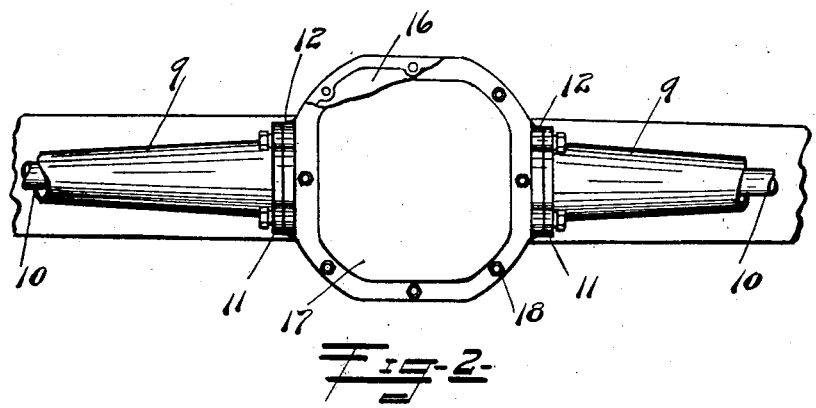
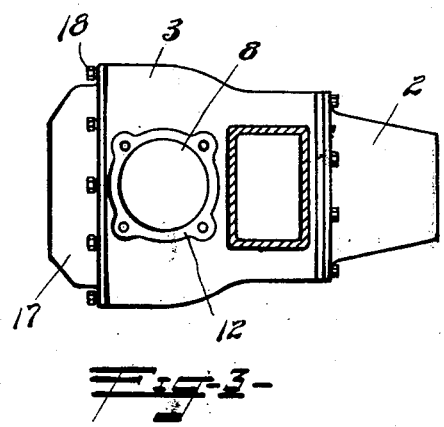
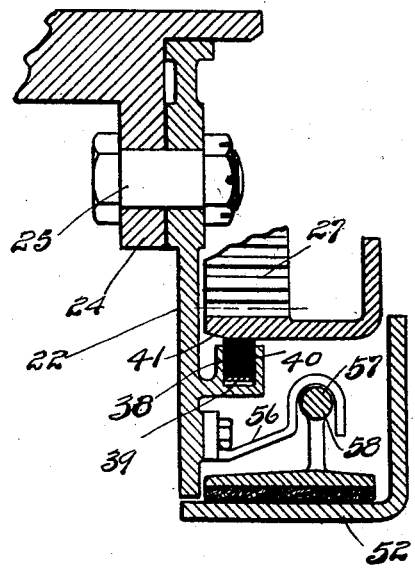
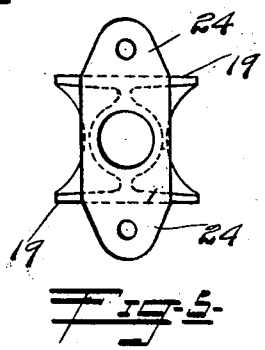
INVENTOR
William M. Britton
BY
Monroe & Farman
ATTORNEYS.

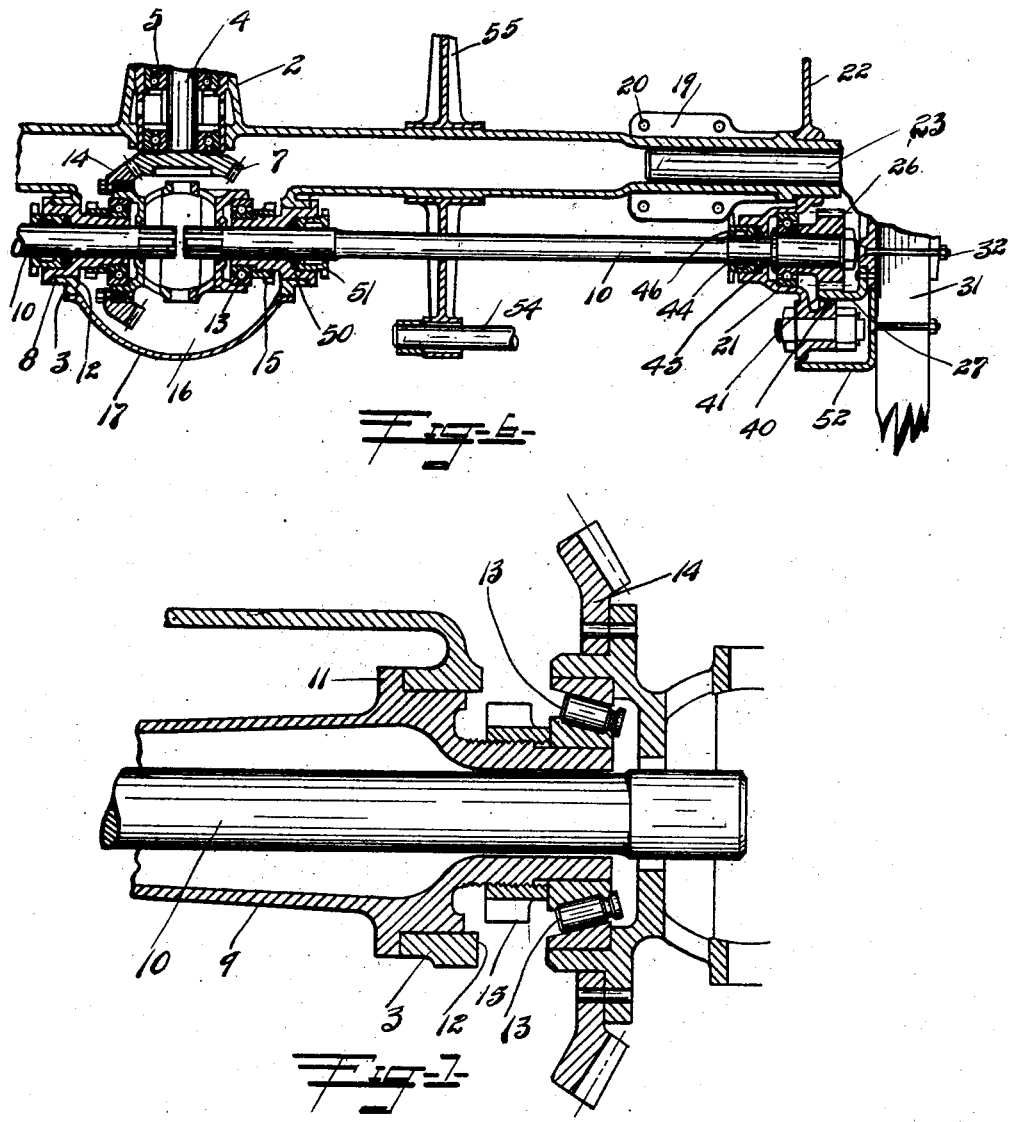

Patented July 8, 1924.

1,500,436

UNITED STATES PATENT OFFICE.

WILLIAM M. BRITTON, OF ALMA, MICHIGAN.

AXLE.

Application filed August 30, 1920. Serial No. 407,000.

*To all whom it may concern:*

Be it known that I, WILLIAM M. BRITTON, a citizen of the United States of America, residing at Alma, in the county of Gratiot and State of Michigan, have invented certain new and useful Improvements in Axles, of which the following is a specification.

This invention relates to improved drive axles for vehicles.

One object of the present invention is to design an axle having a relatively small number of parts, and of such design that its construction will require the minimum amount of machine work, and also the minimum amount of labor in the assembly, removal, or adjustment of the various parts.

A further object of the invention is to construct an internal gear drive type of axle in which the carrying member has great strength for resisting torsional strains, and preventing the gearing and other parts from getting out of proper alinement.

A still further object of the invention is to provide means for protecting the axle driving mechanism from dust and dirt, and for retaining the lubricant by mounting the said means on the ring gear or other member surrounding same, and so shaping the surface thereof that the wheel and gear can be readily removed and placed in proper position without displacing the lubricant retaining packing from its proper position.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details of construction, within the scope of the claims, without departing from the spirit or sacrificing any of the advantages of the invention.

In the drawings:—

Figure 1 is a longitudinal sectional plan view of the center and right hand part of the axle.

Figure 2 is a fragmentary rear view thereof.

Figure 3 is a section taken on the line 3—3 of Figure 1.

Figure 4 is an enlarged fragmentary sectional view of the ring gear, brake and brake supporting member.

Figure 5 is an end view of the main carrying member of the axle.

Figure 6 is a view similar to Figure 1 showing an alternate form of construction.

Figure 7 is an enlarged detail of the bearing carried by the sleeve and which can be adjusted.

In the drawing in which is shown the preferred embodiment of my invention, the axle is shown preferably hollow and rectangular in cross section but it will be understood that any other shape may be used if desired, said axle being provided with a projecting tubular portion 2, and with a rearwardly extending integral housing 3 which is adapted to contain the drive gearing and differential. This forwardly extending tubular portion 2 contains the drive shaft 4 together with the usual bearings 5 and the various other parts used for seating and adjusting the lubricant retaining wick 6, the drive gear 7 being mounted on the shaft 4 and driven from the motor of the vehicle in the usual manner, and while in Figure 1 of the drawings I have shown the member 2 cast separate from the axle and detachably secured thereto, it will be readily understood that it can be formed integral therewith as shown in my alternate construction in Figure 6.

The housing 3 is provided at opposite sides with transverse openings 8, into which the sleeve members 9 which enclose the jack shafts 10 are adapted to extend, said sleeves being provided with annular flanged portions 11 which are bolted or otherwise suitably secured to the shouldered portions 12 of the housing 3, thereby rigidly connecting the said sleeves to the housing and main carrying member.

Bearings 13 are carried on the inner end of the sleeve member 9 which is turned to receive same, or they may be positioned on the inside of the sleeve if desired, the gearing 14 being carried by said bearings which are also capable of adjustment, internally threaded nuts 15 being carried on the sleeves which are threaded to receive them, and it will be apparent that by manipulation of the said nut members, the bearings can be adjusted to compensate for wear or for adjustment of the drive gear 14. The gear 7 meshes with and actuates the gear 14 for driving the vehicle wheels and it is not deemed necessary to describe this in detail as this is the usual construction.

The integral differential housing 3 is provided with a rear opening 16 of a size sufficient to facilitate the ready assembling or removal of the differential and gearing, this opening is normally covered by a cap or cover 17 secured to the housing by means of bolts 18, and I wish to direct particular attention to the even distribution of metal, the relatively small number of parts and surfaces to be machined and fitted, and the ease and speed with which the gears, bearings and various parts can be removed or replaced in the housing.

The main carrying portion of the axle is provided intermediate its ends adjacent its outer portion, with horizontally projecting webs or flanges 19 having openings 20 for the reception of spring clips or other fastening means for securing springs to the axle, these integral webs or flanges extend longitudinally of the axle and are arranged in pairs and are located in front and rear of the axle as shown.

Each jack shaft 10 and the sleeve surrounding same extends outwardly, the shaft being journaled in the bearing 21, carried by the supporting member 22 which is mounted on the axle adjacent the inner end of the spindle 23, the ends of the axle being formed with central openings for receiving the said spindles and also with flanged portions 24 to which the supporting members 22 are secured by means of the bolts 25. A driving pinion 26 is mounted on the outer end of the jack shaft member 10 and meshes with the internal teeth of a ring gear 27 riveted or otherwise secured to the hub member 28 of the wheel.

This member 28 is provided with a central opening 29 and a flanged portion 30 and is secured to the wheel 31 by means of the bolts 32.

The wheel 31 is mounted on the spindle 23 and is provided with inner and outer bearings 33 and 34 arranged as shown and consisting of the inner and outer sleeves with the interposed roller bearings, the spindle being threaded to receive the usual nut member 35 which is covered by a hub cap 36 secured to the member 37.

The supporting member 22 is provided on its inner periphery with a channel 38 adapted to receive a spring 39 and a wick or packing 40 fitting closely to the ring gear and forming a running joint thereat to prevent a leakage of lubricant from the gear case.

The outer surface of the ring gear is tapered as shown at 41 so that when the wheel is placed in position on the spindle, the tapered portion of the ring gear will first come in contact with the wick or packing 40, forcing it into the channel 38 and forming a yieldable and tight joint thereat. A similar channel 42 is formed at the end of the main carrying member and consists of annular strips, one of which is angular in cross section, the packing 43 being received between them, similar springs being provided to press the packing against the inner surface of the hub and prevent leakage of lubricant at this point.

In the construction as shown the sleeves 10 extend into the internally threaded opening 44 provided in the supporting member 22 a shoulder being formed in said opening against which a wick or packing 45 is adapted to be placed, this packing is held in position by means of an exteriorly threaded flange 46 which is adapted to mesh with the threads in the opening 44, thereby eliminating the possibility of lubricant escaping from around the sleeve. The jack shaft 10 is formed with an enlarged portion 10ᵃ near its outer end and a packing 46 surrounds this enlarged portion and is contained in the channel 47 which is formed in the usual manner and provided with the usual springs, and should lubricant escape from the differential housing and flow through the sleeves, this wick 45 will prevent its reaching the ring gear and drive pinion. Threaded openings 48 and 49 are provided for introducing grease to the ring gear and drive pinion.

An alternate construction is shown in Fig. 6 of the drawing in which the tubular portion 2 is cast integral with the main carrying member, and in which the sleeves 9 are short and do not entirely cover the drive or jack shafts 10, being however secured to the housing in the same manner, a packing 50 being provided as shown and an adjustable gland 51 for securing the packing in place, and it will be obvious that a tight joint is formed by the packing 50 at the differential housing thereby preventing the escape of lubricant at this point, and as two separate packings were required at the opposite end of the jack shaft as shown in Figure 1 of the drawings, one to prevent the escape of lubricant through the sleeve and the other to prevent the escape of lubricant from the drive pinion and internal gear, it will be observed that but one packing and adjustable gland is necessary in this outer end in the alternate construction. The wheel is also equipped with a brake drum 52 having an inwardly extending flange and secured to the wheel in any approved manner.

The brake which may be of any desired construction is preferably of the double acting type, bearings 53 being formed in the supporting member 22 for carrying the outer end of the brake shaft 54, the inner end being mounted in brackets 55 secured to and projecting from the main carrying member of the axle. Clips 56 are also secured to the supporting member 22, and are formed with a grooved portion 57 in which the inwardly projecting portion 58 of the brake proper is seated and which is designed to support the brake and hold it in proper position.

While I have shown and described my invention in its best form it will be obvious that various modifications in the arrangement and construction may be used without departing from the spirit or limiting the scope of the invention.

What is claimed is:—

1. A drive axle constituting a main load carrying member having wheel carrying spindles mounted in the ends thereof, said axle having an integral gear housing provided with shaft receiving openings in the sides thereof, the centers of said openings being spaced from the centers of the wheel carrying spindles.

2. A hollow drive axle constituting a one piece main load carrying member having wheel carrying spindles mounted in the ends thereof, a gear housing cast integral with the main load carrying member provided in its sides with shaft receiving openings, the centers of said openings being spaced from the centers of the wheel carrying spindles.

3. A drive axle constituting a one piece load carrying member provided with load carrying means, wheel carrying spindles mounted in the ends of the load carrying member, a gear housing cast integral therewith and provided with shaft receiving openings in the sides thereof, the centers of said openings being spaced from the centers of the spindles, sleeves in the openings, and adjustable bearings mounted on said sleeves.

4. A drive axle constituting a one piece load carrying member and provided with load carrying means and having an integral gear housing, said gear housing being provided in its sides with shaft receiving openings, sleeves in the said openings, bearings carried by the said sleeves, and means accessible from the gear housing for adjusting said bearings.

5. A drive axle constituting a one piece load carrying member and provided with load carrying means and having an integral gear housing, said gear housing being provided in its sides with shaft receiving openings, the centers of said openings being spaced from the centers of the wheel carrying spindles, sleeves in said openings, bearings carried by the said sleeves, gearing carried by said bearings and means accessible from the housing for adjusting said bearings on said sleeves.

6. A drive axle constituting a load carrying member and provided with load carrying means, said axle having a gear housing provided in its sides with shaft receiving openings, the centers of said openings being spaced from the centers of the wheel spindles, sleeves extending into said openings, bearings carried by said sleeves, gearing carried by said bearings, means accessible from the housing for adjusting the bearings, and means for retaining lubricant in said bearings.

In testimony whereof I affix my signature.

WILLIAM M. BRITTON.